United States Patent
Katayama et al.

(10) Patent No.: US 10,626,132 B2
(45) Date of Patent: Apr. 21, 2020

(54) MOISTURE AND ROOM TEMPERATURE-CURABLE ORGANOPOLYSILOXANE RESIN COMPOSITION AND METHOD FOR PRODUCING CURED PRODUCT THEREOF

(71) Applicant: SHIN-ETSU CHEMICAL CO., LTD., Tokyo (JP)

(72) Inventors: Taiki Katayama, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/036,306

(22) Filed: Jul. 16, 2018

(65) Prior Publication Data

US 2018/0319824 A1 Nov. 8, 2018

Related U.S. Application Data (62) Division of application No. 15/508,739, filed as application No. PCT/JP2015/068068 on Jun. 23, 2015, now abandoned.

(30) Foreign Application Priority Data

Sep. 4, 2014 (JP) .................... 2014-180330

(51) Int. Cl.
   *C07F 7/28* (2006.01)
   *C07F 7/08* (2006.01)
   *C08K 5/541* (2006.01)
   *C08L 83/04* (2006.01)

(52) U.S. Cl.
   CPC .......... *C07F 7/28* (2013.01); *C07F 7/08* (2013.01); *C07F 7/0803* (2013.01); *C08K 5/541* (2013.01); *C08L 83/04* (2013.01)

(58) Field of Classification Search
   None
   See application file for complete search history.

(56) References Cited

U.S. PATENT DOCUMENTS

| 4,861,839 A * | 8/1989 | Mizuguchi | C07F 7/1804 525/506 |
| 2003/0153672 A1* | 8/2003 | Sakamoto | C08K 3/36 524/588 |

FOREIGN PATENT DOCUMENTS

| EP | 0 295 657 A2 | 12/1988 |
| GB | 1 473 335 A | 5/1977 |
| JP | 63-313793 A | 12/1988 |
| JP | 2010-65182 A | 12/1988 |
| JP | 10-168320 A | 6/1998 |
| JP | 2002-97367 A | 4/2002 |
| JP | 2005-314325 A | 11/2005 |
| JP | 2012-25876 A | 2/2012 |

OTHER PUBLICATIONS

Chinese Office Action for Appl. No. 201580047703.2 dated Aug. 3, 2018 (w/ English translation).
Abe, Y., et al, "Alkoxysilanes. IV. Preparation of Alkoxysiloxy Derivatives of Titanium," Bulletin of the Chemical Society of Japan, 1970, vol. 43, No. 2, pp. 466-469.
European Search Report for Appl. No. 15839022.9, dated Apr. 11, 2018.
Japanese Office Action for Application No. 2016-546361, dated Jan. 4, 2018, with English Language translation.
Mehrota, et al, "Metal β-Diketonates and Allied Derivatives," Chapter 1, Academic Press, London, 1978.
Notification of Reasons for Refusal dated Oct. 31, 2017, in Japanese Patent Application No. 2016-546361, with English translation.
Chinese Office Action for Appl. No. 201580047703.2 dated Apr. 12, 2019 (w/ English translation).

* cited by examiner

*Primary Examiner* — Clinton A Brooks
*Assistant Examiner* — Kofi Adzamli
(74) *Attorney, Agent, or Firm* — Birch, Stewart, Kolasch & Birch, LLP (57) ABSTRACT

The present invention provides: a novel organic titanium compound having an effect as an adhesion promoter by itself; a production method of such organic titanium compound; and a room temperature-curable resin composition containing such organic titanium compound both as a curing catalyst and as an adhesion promoter. Provided are an organic titanium compound represented by an average composition formula (I):

$$\text{Ti}(OR^1)_{4-a}(Y_3\text{Si-A-O—CO—CH=C(O)R})_a$$

(wherein $R^1$ represents a substituted or unsubstituted monovalent hydrocarbon group having 1 to 12 carbon atoms, R represents a substituted or unsubstituted monovalent hydrocarbon group having 1 to 12 carbon atoms, A represents a divalent hydrocarbon group having 3 to 6 carbon atoms, Y represents a hydrolyzable group, and a represents a number satisfying 0<a<4); a production method of such organic titanium compound; and a room temperature-curable resin composition that contains a room temperature-curable resin.

6 Claims, 1 Drawing Sheet

MOISTURE AND ROOM TEMPERATURE-CURABLE ORGANOPOLYSILOXANE RESIN COMPOSITION AND METHOD FOR PRODUCING CURED PRODUCT THEREOF

This application is a Divisional of U.S. patent application Ser. No. 15/508,739 filed on Mar. 3, 2017, now abandoned. application Ser. No. 15/508,739 was the National Phase of PCT/JP2015/068068 filed Jun. 23, 2015, which claims priority under 35 U.S.C. § 119(a) to Patent Application No. 2014-180330 filed in Japan on Sep. 4, 2014. All of the foregoing applications are hereby expressly incorporated by reference into the present application.

TECHNICAL FIELD

The present invention relates to a novel organic titanium compound useful as a curing catalyst for a room temperature-curable resin composition; a production method of such organic titanium compound; and a room temperature-curable resin composition containing such organic titanium compound both as a curing catalyst and as an adhesion promoter. Particularly, the present invention relates to a room temperature-curable resin composition containing an organopolysiloxane.

BACKGROUND ART

Conventionally, there has been known a room temperature-curable resin composition such as a room temperature-curable organopolysiloxane composition, as a composition capable of being cross-linked and cured by reaction with the moisture in the atmosphere. Such room temperature-curable resin composition is widely used in, for example, the architecture industry, the transportation aircraft industry and the electric and electronic parts industry, due to the fact that it is safe and superior in durability and adhesion as a rubber. Emphasis is often put on adhesion in particular, because adhesion is what significantly impacts the reliability of a member to which the composition was applied.

As a catalyst for use in a room temperature-curable silicone rubber composition, there have been disclosed various kinds of curing catalysts. Particularly, as a curing catalyst for use in a moisture-curable room temperature-curable resin composition having a hydrolyzable silicon group(s) in its molecule, there are used dibutyl tin compounds such as dibutyl tin dilaurate and dibutyl tin diacetate; or organic titanium catalysts such as tetra (n-butoxy) titanium and titanium diisopropoxybis (ethylacetoacetate). These organic metal compounds are widely used, because they are capable of quickly curing a room temperature-curable resin composition.

However, these organic metal compounds used as catalysts for a room temperature-curable resin composition are basically irrelevant to an adhesion after curing. As a matter of fact, these organic metal compounds are therefore simply used as curing catalysts, and it is essential that an adhesion promoter such as a silane coupling agent be separately added to the room temperature-curable resin composition to improve the adhesion after curing (see Patent documents 1 to 4).

PRIOR ART DOCUMENT

Patent Literatures

Patent Literature 1: JP-A-Hei 10-168320
Patent Literature 2: JP-A-2002-097367
Patent Literature 3: JP-A-2010-065182
Patent Literature 4: JP-A-2012-025876

SUMMARY OF INVENTION

Problem to be Solved by the Invention

The present invention was made to solve the aforementioned problems. It is an object of the present invention to provide a novel organic titanium compound having an effect as an adhesion promoter by itself, and capable of quickly curing a room temperature-curable resin composition; a production method of such organic titanium compound; and a room temperature-curable resin composition containing such organic titanium compound both as a curing catalyst and as an adhesion promoter. Even when there is used an other adhesion promoter, the amount of such adhesion promoter used can be reduced such that an economically advantageous room temperature-curable resin composition can be provided.

Means to Solve the Problem

The inventors of the present invention diligently conducted studies to achieve the above objectives, and completed the invention as follows. That is, the inventors found that the following organic titanium compound and production method thereof were useful in solving the above problems.

That is, the present invention is to provide the following organic titanium compound.

<1> An organic titanium compound represented by an average composition formula (I):

Ti(OR$^1$)$_{4-a}$(Y$_3$Si-A-O—CO—CH=C(O)R)$_a$ (wherein R$^1$ represents a substituted or unsubstituted monovalent hydrocarbon group having 1 to 12 carbon atoms; R represents a substituted or unsubstituted monovalent hydrocarbon group having 1 to 12 carbon atoms; A represents a divalent hydrocarbon group having 3 to 6 carbon atoms; Y represents a hydrolyzable group; and a represents a number satisfying 0<a<4).

<2> The organic titanium compound according to <1>, wherein the organic titanium compound is a reaction product of an organic silicon compound and an organooxy titanium, the organic silicon compound having a β-ketoester structure and being represented by the following general formula (1):

[Chemical formula 1]

(1)

(wherein R, A and Y are defined as above), and the organooxy titanium being represented by the following general formula (2):

[Chemical formula 2]

Ti(OR$^1$)$_4$ (2)

(wherein R$^1$ is defined as above).

<3> The organic titanium compound according to <2>, wherein the organic silicon compound represented by the general formula (1) is a reaction product of an unsaturated aliphatic group-containing β-ketoester and a hydrolyzable silane compound, the unsaturated aliphatic group-containing β-ketoester being represented by the following general formula (3):

[Chemical formula 3]

(3)

(wherein R is defined as above; and $A^1$ represents a divalent hydrocarbon group having 1 to 4 carbon atoms), and the hydrolyzable silane compound being represented by the following general formula (4):

[Chemical formula 4]

$$HSiY_3 \quad (4)$$

(wherein Y is defined as above).

<4> The organic titanium compound according to any one of <1> to <3>, wherein in the average composition formula (I): $Ti(OR^1)_{4-a}(Y_3Si\text{-}A\text{-}O\text{—}CO\text{—}CH\text{=}C(O)R)_a$, an average coordination number a of a hydrolyzable silyl group-containing β-ketoester structure to titanium is 0.5 to 2.5.

With regard to the organic titanium compound of the invention that has been defined above, as long as the average structure of an organic titanium compound aggregate belongs to the above scope, the aggregate shall be included in the present invention, even when the structures of the individual organic titanium compounds differ from one another.

Further, the present invention is to provide the following production method <5> of the organic titanium compound.

<5> A production method of the organic titanium compound as set forth in <1>, comprising a step of reacting an organic silicon compound and an organooxy titanium, the organic silicon compound having a β-ketoester structure and being represented by the following general formula (1):

[Chemical formula 5]

(1)

(wherein R, A and Y are defined as above), and the organooxy titanium being represented by the following general formula (2):

[Chemical formula 6]

$$Ti(OR^1)_4 \quad (2)$$

(wherein $R^1$ is defined as above).

Further, the present invention is to provide, for example, the following room temperature-curable resin compositions <6> to <10>.

<6> A room temperature-curable resin composition comprising:
(A) the organic titanium compound as set forth in any one of <1> to <4>; and
(B) a room temperature-curable resin.

<7> The room temperature-curable resin composition according to <6>, comprising the organic titanium compound (A) as set forth in any one of <1> to <4> in an amount of 0.01 to 30 parts by mass per 100 parts by mass of the room temperature-curable resin (B).

<8> The room temperature-curable resin composition according to <6> or <7>, wherein the room temperature-curable resin composition (B) contains a curable organopolysiloxane.

<9> The room temperature-curable resin composition according to <7> or <8>, further comprising, per 100 parts by mass of the component (B),
(C) 0 to 15 parts by mass of a curing catalyst other than the component (A),
(D) 0 to 30 parts by mass of a hydrolyzable group-containing silane and/or a partial hydrolysis condensate thereof,
(E) 0 to 1,000 parts by mass of a filler and
(F) 0 to 30 parts by mass of an adhesion promoter.

<10> A coating agent, adhesive agent or sealing agent comprising the room temperature-curable resin composition as set forth in any one of <6> to <9>.

Effects of the Invention

The novel organic titanium compound of the present invention has an effect as an adhesion promoter, and is capable of quickly curing a room temperature-curable resin composition. Thus, the organic titanium compound of the invention is useful as a curing catalyst for a room temperature-curable resin composition.

Further, since the room temperature-curable resin composition of the invention contains the particular organic titanium compound both as a curing catalyst and as an adhesion promoter, it can be cured in a short period of time without using an other adhesion promoter, and can also become a room temperature-curable resin composition having a sufficient adhesion strength, particularly, a room temperature-curable organopolysiloxane resin composition capable of forming a silicone rubber elastic body after curing. Furthermore, there can be obtained, after curing, a cured product with a sufficient hardness, shear elongation at break and tensile strength i.e. a cured product having physical properties of a rubber.

In addition, such room temperature-curable resin composition of the invention is suitable for use in a coating agent, adhesive agent or sealing agent.

MODE FOR CARRYING OUT THE INVENTION

The present invention is described in detail hereunder. However, the present invention is not limited to the following examples.

<Organic Titanium Compound>

An organic titanium compound of the present invention is represented by an average composition formula (I): $Ti(OR^1)_{4-a}(Y_3Si\text{-}A\text{-}O\text{—}CO\text{—}CH\text{=}C(O)R)_a$.

Here, in the above average composition formula (I), examples of a substituted or unsubstituted monovalent hydrocarbon group represented by R and having 1 to 12 carbon atoms, include an alkyl group such as a methyl group, an ethyl group, a propyl group, an isopropyl group, a butyl group, an isobutyl group, a tert-butyl group, a pentyl group, a hexyl group, a heptyl group, an octyl group, a 2-ethylhexyl group, a nonyl group, a decyl group and a dodecyl group; a cycloalkyl group such as a cyclopentyl group and a cyclohexyl group; an alkenyl group such as a vinyl group, an allyl group, a propenyl group, an isopropenyl group, a butenyl group, a pentenyl group, a hexenyl group and a cyclohexenyl group; an aryl group such as a phenyl group, a tolyl group, a xylyl group and an α-, β-naphthyl group; an aralkyl group such as a benzyl group, a 2-phenylethyl group and a 3-phenylpropyl group; or a group obtained by substituting a part of or all the hydrogen atoms in any of these groups with, for example, cyano groups or halogen atoms such as F, Cl and Br, the examples of which being a 3-chloropropyl group, a 3,3,3-trifluoropropyl group and a 2-cyanoethyl group. Among the above groups, lower alkyl groups such as a methyl group and an ethyl group are preferred, and a methyl group is particularly preferred.

In the above average composition formula (I), it is preferred that a divalent hydrocarbon group represented by A and having 3 to 6 carbon atoms be a saturated aliphatic divalent hydrocarbon group such as a linear or branched alkyene group represented by —$C_pH_{2p}$—, more preferably a linear alkylene group represented by —$(CH_2)_p$— (p is 3 to 6). Among these groups, —$(CH_2)_3$— is particularly preferred.

In the above average composition formula (I), Y represents a hydrolyzable group. Examples of such hydrolyzable group represented by Y include an alkoxy group such as a methoxy group, an ethoxy group and a propoxy group; an alkoxyalkoxy group such as a methoxyethoxy group, an ethoxyethoxy group, a methoxypropoxy group; an acyloxy group such as an acetoxy group, an octanoyloxy group and a benzoyloxy group; an alkenyloxy group such as a vinyloxy group, an allyloxy group, a propenyloxy group, an isopropenyloxy group and a 1-ethyl-2-methylvinyloxy group; a ketoxime group such as a dimethylketoxime group, a methylethylketoxime group and a diethylketoxime group; an amino group such as a dimethylamino group, a diethylamino group, a butylamino group and a cyclohexylamino group; an aminoxy group such as a dimethylaminoxy group and a diethylaminoxy group; and an amide group such as an N-methylacetamide group, an N-ethylacetamide group and an N-methylbenzamide group. Among these groups, an alkoxy group is preferred, and lower alkoxy groups such as a methoxy group and an ethoxy group are particularly preferred.

In the above average composition formula (I), examples of a substituted or unsubstituted monovalent hydrocarbon group represented by $R^1$ and having 1 to 12 carbon atoms, include an alkyl group such as a methyl group, an ethyl group, a propyl group, an isopropyl group, a butyl group, an isobutyl group, a tert-butyl group, a pentyl group, a hexyl group, a heptyl group, an octyl group, a 2-ethylhexyl group, a nonyl group, a decyl group and a dodecyl group; a cycloalkyl group such as a cyclopentyl group and a cyclohexyl group; an alkenyl group such as a vinyl group, an allyl group, a propenyl group, an isopropenyl group, a butenyl group, a pentenyl group, a hexenyl group and a cyclohexenyl group; an aryl group such as a phenyl group, a tolyl group, a xylyl group and an α, β-naphthyl group; an aralkyl group such as a benzyl group, a 2-phenylethyl group and a 3-phenylpropyl group; or a group obtained by substituting a part of or all the hydrogen atoms in any of these groups with, for example, cyano groups or halogen atoms such as F, Cl and Br, the examples of which being a 3-chloropropyl group, a 3,3,3-trifluoropropyl group and a 2-cyanoethyl group. Among the above groups, lower alkyl groups such as a methyl group, an ethyl group and an isopropyl group are preferred, and an isopropyl group is particularly preferred.

In the above average composition formula (I), an average coordination number a of a hydrolyzable silyl group-containing β-ketoester structure to titanium is 0.5 to 2.5, preferably 1.5 to 2.4, more preferably 1.7 to 2.3, and particularly preferably about 2.

The organic titanium compound of the present invention can, for example, be produced by the following method.

The target organic titanium compound can be produced by reacting an organic silicon compound and an organooxy titanium (e.g. tetraorganooxy titanium such as tetraalkoxy titanium), and then distilling away a hydroxy group-containing compound such as an alcohol represented by $R^1$—OH and obtained as a by-product from the reaction solution.

The organic silicon compound used here is represented by the following general formula (1), and has a β-ketoester structure and a hydrolyzable silyl group.

[Chemical formula 7]

(1)

(In the above formula, R, A and Y are defined as above.)

The organooxy titanium used here is represented by the following general formula (2)

[Chemical formula 8]

$$Ti(OR^1)_4 \quad (2)$$

(In the above formula, 1e is defined as above.)

A ratio of the organic silicon compound represented by the general formula (1) and the organooxy titanium represented by the general formula (2) depends on the coordination number of the β-ketoester structure to titanium in the target organic titanium compound. However, the organic silicon compound (1) is normally in an amount of 1 to 4 mol, preferably 1 to 3 mol, particularly 1.5 to 2.5 mol, per 1 mol of the organooxy titanium (2). The reaction may be performed at room temperature, and is preferably performed while performing stirring. The reaction time is normally 15 to 30 hours, particularly about 24 hours.

Further, the organic silicon compound represented by the general formula (1) can be prepared by reference to, for example, a known method (JP-A-2005-314325) where an unsaturated aliphatic group-containing β-ketoester and a hydrolyzable silane compound are reacted.

The unsaturated aliphatic group-containing β-ketoester used here is represented by the following general formula (3).

[Chemical formula 9]

(3)

(In the above formula, R is defined as above; $A^1$ is a divalent hydrocarbon group having 1 to 4 carbon atoms.)

The hydrolyzable silane compound used here is represented by the following general formula (4).

[Chemical formula 10]

$$HSiY_3 \quad (4)$$

(In the above formula, Y is defined as above.)

Here, $A^1$ is a group obtained by eliminating an ethylene group ($-(CH_2)_2-$) from A in the general formula (1).

In the above general formula (3), it is preferred that the divalent hydrocarbon group represented by $A^1$ and having 1 to 4 carbon atoms be a saturated aliphatic divalent hydrocarbon group such as a linear or branched alkylene group represented by $-C_pH_{2p}-$, more preferably a linear alkylene group represented by $-(CH_2)_p-$ (p is 1 to 4). Among these groups, $-(CH_2)-$ is particularly preferred.

Specific examples of such organic titanium compound include a titanium diisopropoxybis (trimethoxysilylpropyl acetoacetate) and a titanium diisopropoxybis (triethoxysilylpropyl acetoacetate) that are represented by the following structural formulae.

Structural formula of titanium diisopropoxybis (trimethoxysilylpropyl acetoacetate):

[Chemical formula 11]

Structural formula of titanium diisopropoxybis (triethoxysilylpropyl acetoacetate):

[Chemical formula 12]

<Room Temperature-Curable Resin Composition>

A room temperature-curable/vulcanizable resin composition of the present invention is a room temperature-curable resin composition containing the above organic titanium compound (A) and a room temperature-curable resin (B). It is preferred that the room temperature-curable resin composition of the invention be a composition containing the organic titanium compound (A) by an amount of 0.01 to 30 parts by mass per 100 parts by mass of the room temperature-curable resin (B), or a composition where the room temperature-curable resin (B) contains a curable organopolysiloxane (so-called room temperature-curable organopolysiloxane composition). It is particularly preferred that, per 100 parts by mass of the curable organopolysiloxane (B), the room temperature-curable resin composition of the invention (room temperature-curable organopolysiloxane composition) contain (A) 0.01 to 30 parts by mass of the organic titanium compound,
(C) 0 to 15 parts by mass of a curing catalyst other than the component (A),
(D) 0 to 30 parts by mass of a hydrolyzable group-containing silane and/or a partial hydrolysis condensate thereof,
(E) 0 to 1,000 parts by mass of a filler and
(F) 0 to 30 parts by mass of an adhesion promoter.

And, it is especially preferred that the room temperature-curable resin composition of the invention be a room temperature-curable silicone rubber composition capable of being cured at room temperature and thus forming a rubber-like elastic body (elastomer).

Component (A)

The organic titanium compound as the component (A) is represented by the above average composition formula (I): $Ti(OR^1)_{4-a}(Y_3Si-A-O-CO-CH=C(O)R)_a$.

The above organic titanium compound contained in the room temperature-curable resin composition of the present invention is capable of quickly curing the room temperature-curable resin composition, thus serving as a curing catalyst for the room temperature-curable resin composition. Further, such organic titanium compound is capable of improving the adhesiveness of the room temperature-curable resin composition, thus also serving as an adhesion promoter for the room temperature-curable resin composition. That is, a room temperature-curable resin composition with a sufficient adhesion strength can be obtained without using a silane coupling agent as an adhesion promoter, provided that the room temperature-curable resin composition is the room temperature-curable resin composition of the present invention that contains the organic titanium compound both as a curing catalyst and as an adhesion promoter. Further, this composition can be cured in a short period of time, and form, after curing, a cured product with a sufficient hardness, shear elongation at break and tensile strength i.e. a cured product having physical properties of a rubber.

Certainly, the adhesion strength can be further improved by using the organic titanium compound of the invention as an adhesion promoter together with a silane coupling agent. Even in such case, the amount of a silane coupling agent used can be reduced in a way such that there can be provided a composition that is economically more advantageous than the conventional ones.

Here, it is preferred that the organic titanium compound in the room temperature-curable resin composition of the present invention be added in an amount of 0.01 to 30 parts by mass, more preferably 0.05 to 15 parts by mass, particularly preferably 0.1 to 5 parts by mass, per 100 parts by mass of a room temperature-curable resin such as a later-described curable organopolysiloxane as the component (B).

Component (B)

There are no particular restrictions on a base compound resin (base polymer) of the room temperature-curable resin composition of the invention, as long as such base compound resin is a room temperature-curable organic resin. However, it is preferred that such base compound resin contain a curable organopolysiloxane.

The curable organopolysiloxane as a preferable example of the component (B) serves as a base compound (base polymer) of the room temperature-curable resin composition. The curable organopolysiloxane has in its molecule at least two silicon atom-bonded hydroxyl groups (silanol groups) or hydrolyzable groups as curable functional groups. Preferably, these groups are located at both ends of the molecular chain of such curable organopolysiloxane.

Specific examples of such organopolysiloxane include a linear diorganopolysiloxane represented by the following general formula (5) where the ends of its molecular chain are blocked by hydroxyl groups (diorganohydroxysilyl groups); or a linear diorganopolysiloxane represented by the following general formula (6) where the ends of its molecular chain are blocked by hydrolyzable groups (hydrolyzable group-containing triorganosilyl groups).

[Chemical formula 13]

(In the above formula, R is defined as above; X represents an oxygen atom or a divalent or trivalent hydrocarbon group having 1 to 8 carbon atoms; Y' represents a hydrolyzable group; b represents 0 or 1; and m represents a number by which a viscosity of such diorganopolysiloxane will become 100 to 1,000,000 mPa·s at 25° C.)

In the above general formulae (5) and (6), X represents an oxygen atom or a divalent or trivalent hydrocarbon group having 1 to 8 carbon atoms, and it is preferred that X be that represented by $-(CH_2CH_2)_q-$ or $-(CH=CH)_q-$ (q represents 1 to 4). Here, an oxygen atom, $-CH_2CH_2-$ or $-CH=CH-$ is particularly preferred.

In the above general formula (6), Y' represents a hydrolyzable group, and examples of such hydrolyzable group include an alkoxy group such as a methoxy group, an ethoxy group and a propoxy group; an alkoxyalkoxy group such as a methoxyethoxy group, an ethoxyethoxy group and a methoxypropoxy group; an acyloxy group such as an acetoxy group, an octanoyloxy group and a benzoyloxy group; an alkenyloxy group such as a vinyloxy group, an allyloxy group, a propenyloxy group, an isopropenyloxy group and a 1-ethyl-2-methylvinyloxy group; a ketoxime group such as a dimethylketoxime group, a methylethylketoxime group and a diethylketoxime group; an amino group such as a dimethylamino group, a diethylamino group, a butylamino group and a cyclohexylamino group; an aminoxy group such as a dimethylaminoxy group and a diethylaminoxy group; and an amide group such as an N-methylacetamide group, an N-ethylacetamide group and an N-methylbenzamide group. Among these groups, an alkoxy group having 1 to 3 carbon atoms is particularly preferred.

It is preferred that the viscosity of the curable organopolysiloxane as the component (B) at 25° C. be 100 to 1,000,000 mPa·s, more preferably 300 to 500,000 mPa·s, particularly preferably 500 to 100,000 mPa·s, and especially preferably 1,000 to 80,000 mPa·s. When such viscosity of the organopolysiloxane is not lower than 100 mPa·s, there can be obtained a coating film superior in physical and mechanical strengths. It is also preferable when such viscosity is not higher than 1,000,000 mPa·s, because a workability at the time of use will not be impaired due to an extremely high viscosity of the room temperature-curable resin composition. Here, the viscosity is a numerical value obtained through a rotary viscometer (Brookfield viscometer).

The following diorganopolysiloxanes are specific examples of the curable organopolysiloxane as the component (B).

[Chemical formula 14]

(In above formula, R, Y', b and m are defined as above.)

As the organopolysiloxane (B), there may be used only one kind of such organopolysiloxane; or two or more kinds of such organopolysiloxanes with different structures and molecular weights, in combination.

In the case of the room temperature-curable resin composition of the invention that contains such curable organopolysiloxane(s) (room temperature-curable organopolysiloxane composition in particular), the composition can be cured in a short period of time, and exhibit a sufficient adhesion strength after curing.

Component (C)

The component (C) is a curing catalyst other than the component (A), and is used as an optional component if necessary for further shortening the curing time of the room temperature-curable resin composition. Examples of such catalyst include an alkyl tin ester compound such as dibutyl tin diacetate, dibutyl tin dilaurate and dibutyl tin dioctoate; a titanic acid ester or titanium chelate compound such as tetraisopropoxytitanium, tetra n-butoxytitanium, tetrakis (2-ethylhexoxy) titanium, dipropoxybis (acetylacetonato) titanium and titanium isopropoxyoctylene glycol; an organic metal compound such as zinc naphthenate, zinc stearate, zinc-2-ethyloctoate, iron-2-ethylhexoate, cobalt-2-ethylhexoate, manganese-2-ethylhexoate, cobalt naphthenate, an alkoxyaluminum compound and an aluminum chelate compound; an aminoalkyl group-substituted alkoxysilane such as 3-aminopropyltriethoxysilane and N-β(aminoethyl) γ-aminopropyltrimethoxysilane; an amine compound such as hexylamine and dodecylamine phosphate, as well as a salt of such amine compound; a quaternary ammonium salt such as benzyl triethyl ammonium acetate; a lower fatty acid salt of an alkali metal, such as potassium acetate, sodium acetate and lithium oxalate; a dialkylhydroxylamine such as dimethylhydroxylamine and diethylhydroxylamine; and a guanidyl group-containing silane or siloxane, such as tetramethylguanidylpropyltrimethoxysilane, tetramethylguanidylpropylmethyldimethoxysilane and tetramethylguanidylpropyltris (trimethylsiloxy) silane. The component (C) is not limited to any one of these catalysts, and two or more of these catalysts may be used together as a mixture.

Further, these curing catalysts are preferably added in an amount of 0 to 15 parts by mass, particularly preferably 0.01 to 5 parts by mass, per 100 parts by mass of the organopolysiloxane as the component (B).

Component (D)

The hydrolyzable group-containing silane and/or the partial hydrolysis condensate thereof as the component (D) serve as a cross-linking agent, and are added as an optional component if necessary. Examples of such hydrolyzable group include a ketoxime group, an alkoxy group, an acetoxy group and an isopropenoxy group, among which an alkoxy group and an isopropenoxy group are preferred.

Specific examples of the component (D) include alkoxysilanes such as methyltrimethoxysilane, dimethyldimethoxysilane, vinyltrimethoxysilane, phenyl trimethoxysilane, methyltriethoxysilane and α-(dimethoxymethylsilyl) propionic acid 2-ethylhexyl; isopropenoxy group-containing silanes such as methyltriisopropenoxysilane, ethyltriisopropenoxysilane, vinyltriisopropenoxysilane and phenyltriisopropenoxysilane; acetoxysilanes such as methyltriacetoxysilane, ethyltriacetoxysilane and vinyltriacetoxysilane; and partial hydrolysis condensates of these silanes. Any of these silanes and partial hydrolysis condensates may be used singularly, or two or more of them may be used in combination.

The component (D) is normally added in an amount of 0 to 3 parts by mass, preferably 0.1 to 20 parts by mass, more preferably 0.5 to 15 parts by mass, per 100 parts by mass of the component (B). It is preferable when the component (D) is added in an amount of not larger than 30 parts by mass, because the cured product will not become excessively hard, and because this amount is economical.

Component (E)

The filler as the component (E) is used as an optional component if necessary, for the purpose of imparting a sufficient mechanical strength to the cured product formed of the composition of the invention. Here, a known filler may be used as such filler, and examples of such known filler include a finely powdered silica; a fumed silica; a silica aerogel; a precipitated silica; a diatom earth; a metal oxide such as an iron oxide, a zinc oxide and a titanium oxide, each of which may be surface treated with silane; a metal carboxylate such as calcium carbonate, magnesium carbonate and zinc carbonate; an inorganic filler such as asbestos, a glass wool, carbon black, finely powdered mica and a molten silica powder; or a synthetic resin powder such as polystyrene, polyvinyl chloride and polypropylene.

The component (E) is preferably added in an amount of 0 to 1,000 parts by mass, particularly preferably 5 to 200 parts by mass, per 100 parts by mass of the component (B). By adding the component (E), the cured product obtained from the room temperature-curable resin composition will exhibit a sufficient mechanical strength. Further, it is preferable when the component (E) is added in an amount of not larger than 1,000 parts by mass, because the workability will not be impaired due to an increased viscosity of the composition, or a rubber elasticity will also not be impaired due to a decreased rubber strength after curing.

Component (F)

The component (F) is the adhesion promoter other than the component (A), and is added as an optional component if necessary. Particularly, it is preferred that there be added amino functional group-containing alkoxysilanes such as γ-aminopropyltriethoxysilane and 3-2-(aminoethylamino) propyltrimethoxysilane; epoxy functional group-containing alkoxysilanes such as γ-glycidoxypropyltrimethoxysilane and β-(3,4-epoxycyclohexyl) ethyltrimethoxysilane; or a silane coupling agent such as isocyanate functional group-containing alkoxysilane (carbon functional hydrolyzable silanes). It is preferred that these adhesion promoters be added in an amount of 0 to 30 parts by mass, particularly preferably 0.2 to 10 parts by mass, per 100 parts by mass of the organopolysiloxane as the component (B).

As described above, the room temperature-curable resin composition of the invention contains the organic titanium compound (A) both as a curing catalyst and as an adhesion promoter. For this reason, when using the adhesion promoter as the component (F), such as the silane coupling agent, the amount thereof can be reduced, thus achieving an economically advantageous room temperature-curable resin composition.

Other Additives

Other than the components (A) to (F), known additives may also be added to the room temperature-curable resin composition of the invention. Examples of such additives include a pigment, a dye, an anti-degradation agent, an antioxidant, an antistatic agent, and a flame retardant such as antimony oxide and chlorinated paraffin. Moreover, there may also be added, for example, polyether as a thixotropy improving agent, an antifungal agent, an antibacterial agent or an adhesion aid.

Particularly, the room temperature-curable resin composition of the invention is inherently different from a so-called primer composition in a sense that the composition of the invention essentially contains the room temperature-curable resin component (base polymer) as the component (B), such as the organopolysiloxane having the room temperature-curable functional groups, whereas a primer composition has no curability by itself, but is directly applied to the surface of an adherend to improve an adhesion between various organic rubbers and the adherend.

As described above, since the room temperature-curable resin composition of the present invention contains the organic titanium compound as a curing catalyst, it can be cured in a short period of time, and become a room temperature-curable resin composition having a sufficient adhesion strength. Further, the composition of the invention when cured will become a cured product with a sufficient hardness, shear elongation at break and tensile strength i.e. a cured product having physical properties of a rubber. Furthermore, such room temperature-curable resin composition of the invention is suitable as a fast curing resin, and is thus suitable for use in a coating agent, an adhesive agent or a sealing agent.

WORKING EXAMPLE

The present invention is described in detail hereunder with reference to synthetic, working and comparative examples. However, the invention is not limited to these examples. Here, ordinary pressure refers to 1 atm; and room temperature refers to 25±5° C. Further, a viscosity refers to a value measured by a rotary viscometer (Brookfield viscometer) at 25° C. Furthermore, part(s) refer to parts by mass.

Synthetic Example 1

Titanium tetraisopropoxide of 14.2 g (0.05 mol) was put into a 50 ml eggplant-shaped flask, followed by delivering thereinto by drops trimethoxysilylpropyl acetoacetate of 26.4 g (about 0.10 mol with infinitesimal amount of impurities such as isomers contained, the same applies hereafter) while performing stirring, such trimethoxysilylpropyl acetoacetate being a reaction product of allyl acetoacetate and trimethoxysilane. After performing stirring at room temperature for 24 hours, isopropanol as a by-product was distilled away so as to obtain 34.2 g (yield 99%) of a product that was in the form of a thick yellow liquid, and had the structure of a titanium diisopropoxybis (trimethoxysilylpropyl acetoacetate) as its typical average structure.

Figure 1:
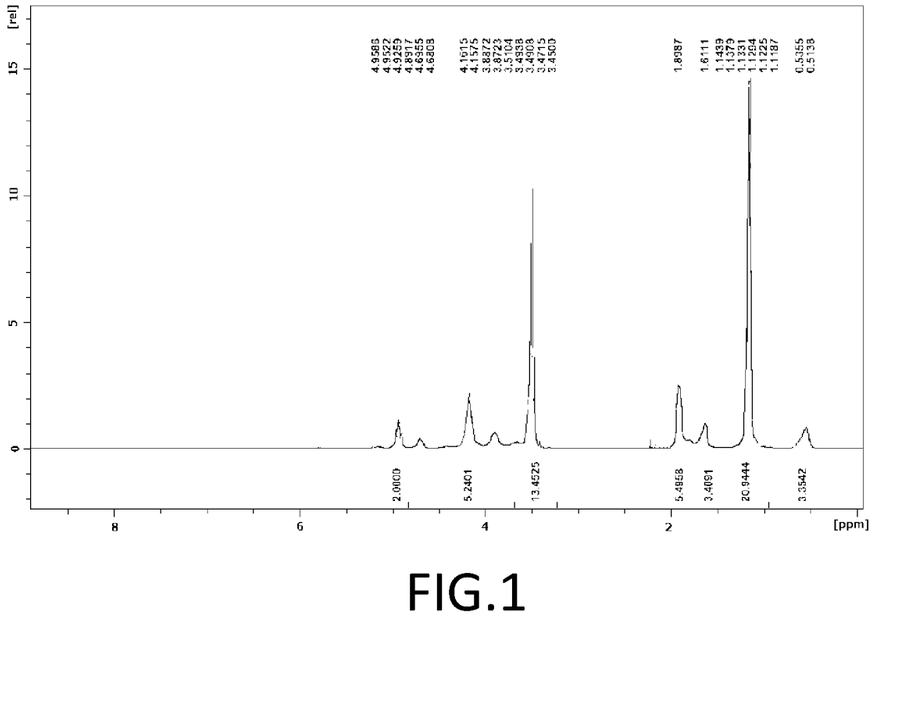
FIG. 1 is a $^1$H NMR chart of an organic titanium compound obtained in a synthetic example 1.

In order to confirm the average structure of the above product, a $^1$H-NMR spectrum measurement was performed (FIG. 1).

$^1$H-NMR spectrum:
δ 0.51 to 0.53 (H 4, SiCH$_2$CH$_2$CH$_2$)
δ 1.12 to 1.14 (H 12, Ti—OCH(CH$_3$)$_2$)
δ 1.61 (H 4, SiCH$_2$CH$_2$CH$_2$)
δ 1.90 (H 6, CH$_3$C(O)=CH)
δ 3.45 to 3.51 (H 18, Si(OCH$_3$)$_3$)
δ 3.87 to 3.88 (H 2, Ti—OCH(CH$_3$)$_2$)
δ 4.15 to 4.16 (H 4, SiCH$_2$CH$_2$CH$_2$)
δ 4.89 to 4.96 (H 2, CH$_3$C(O)=CH)

According to the result of the $^1$H-NMR spectrum measurement, the typical average structure of the product obtained above was considered as that of a titanium diisopropoxybis (trimethoxysilylpropyl acetoacetate) represented by the following formula (7).

[Chemical formula 15]

(7)

Synthetic Example 2

Titanium tetraisopropoxide of 14.2 g (0.05 mol) was put into a 50 ml eggplant-shaped flask, followed delivering thereinto by drops triethoxysilylpropyl acetoacetate of 30.6 g (about 0.10 mol) while performing stirring, such triethoxysilylpropyl acetoacetate being a reaction product of allyl acetoacetate and triethoxysilane. After performing stirring at room temperature for 24 hours, isopropanol as a by-product was distilled away so as to obtain 38.4 g (yield 99%) of a product that was in the form of a thick yellow liquid, and had the structure of a titanium diisopropoxybis (triethoxysilylpropyl acetoacetate) as its typical average structure.

Figure 2:
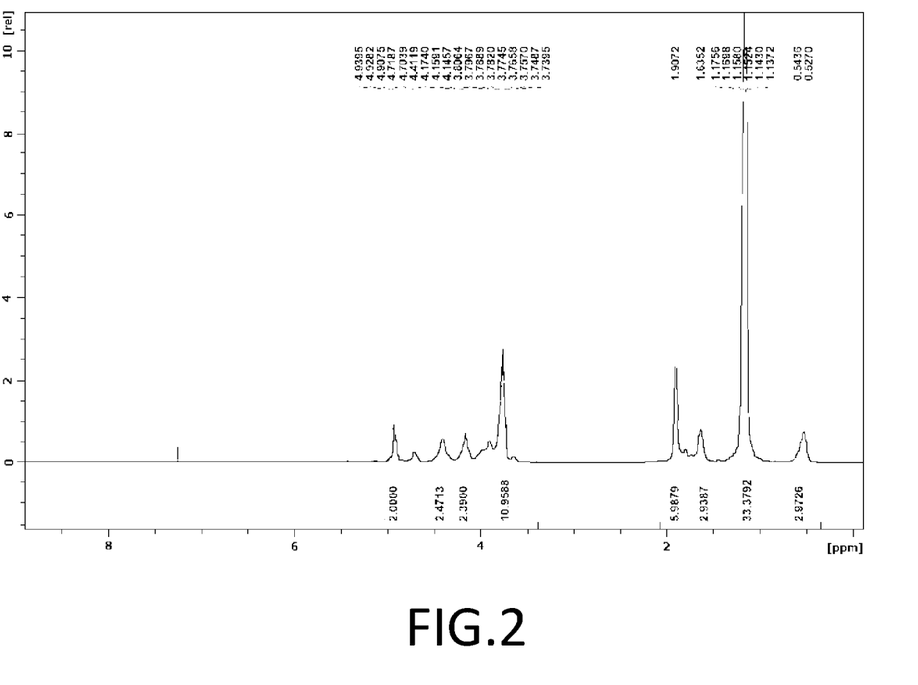
FIG. 2 is a $^1$H NMR chart of an organic titanium compound obtained in a synthetic example 2.

In order to confirm the average structure of the above product, a $^1$H-NMR spectrum measurement was performed (FIG. 2).

$^1$H-NMR spectrum:
δ 0.53 to 0.54 (H 4, SiCH$_2$CH$_2$CH$_2$)
δ 1.12 to 1.14 (H 30, Ti—OCH(CH$_3$)$_2$, Si(OCH$_2$CH$_3$)$_3$)
δ 1.63 (H 4, SiCH$_2$CH$_2$CH$_2$)
δ 1.90 (H 6, CH$_3$C(O)=CH)
δ 3.74 to 3.80 (H 12, Si(OCH$_2$CH$_3$)$_3$)
δ 4.70 to 4.71 (H 6, Ti—OCH(CH$_3$)$_2$, SiCH$_2$CH$_2$CH$_2$)
δ 4.91 to 4.94 (H 2, CH$_3$C(O)=CH)

According to the result of the $^1$H-NMR spectrum measurement, the typical average structure of the product obtained above was considered as that of a titanium diisopropoxybis (triethoxysilylpropyl acetoacetate) represented by the following formula (8).

[Chemical formula 16]

(8)

In the following working and comparative examples, the compositions below were used.

Component (A)
A-1: Titanium diisopropoxybis (trimethoxysilylpropyl acetoacetate) (product of synthetic example 1)
A-2: Titanium diisopropoxybis (triethoxysilylpropyl acetoacetate) (product of synthetic example 2)
A-3 (for use in comparative examples): Titanium diisopropoxybis (ethylacetoacetate) (product name: TC-750 by Matsumoto Fine Chemical Co., Ltd.)
A-4 (for use in comparative examples): Tetraoctyl titanate (product name: TA-30 by Matsumoto Fine Chemical Co., Ltd.)

Component (B)
B-1: Dimethylpolysiloxane with both ends of its molecular chain blocked by methyldimethoxysilyl groups, and having a viscosity of 20,000 mPa·s
B-2: Dimethylpolysiloxane with both ends of its molecular chain blocked by hydroxyl groups (silanol groups), and having a viscosity of 20,000 mPa·s Component (C)
C-1: Guanidylpropyltrimethoxysilane Component (D)
D-1: Methyltrimethoxysilane
D-2: α-(dimethoxymethylsilyl) propionic acid 2-ethylhexyl Component (E)
E-1: Surface-treated hydrophobic silica (product name: MU-215 by Shin-Etsu Chemical Co., Ltd.)

Working Example 1

The surface-treated hydrophobic fumed silica (E-1) of 13 parts (product name MU-215 by Shin-Etsu Chemical Co., Ltd.; product surface-hydrophobized by dimethyldichlorosilane; BET specific surface area 120 m$^2$/g; water amount 0.5% by mass), was added to 100 parts of the dimethylpolysiloxane (B-1) with both ends of its molecular chain blocked by methyldimethoxysilyl groups and having the viscosity of 20,000 mPa·s, followed by mixing these components at room temperature and under ordinary pressure for 30 min, and then mixing the same again at room temperature and under a reduced pressure for another 15 min to obtain a mixed product. The methyltrimethoxysilane (D-1) of 6 parts; and 2 parts of the titanium diisopropoxybis (trimethoxysilylpropyl acetoacetate) (A-1) prepared in the synthetic example 1, were added to the mixed product, followed by mixing them at room temperature and under ordinary pressure for 5 min, and then mixing them at room temperature and under a reduced pressure for another 60 min so as to obtain a composition 1.

Working Example 2

The surface-treated hydrophobic silica (E-1) of 13 parts was added to 100 parts of the dimethylpolysiloxane (B-1) with both ends of its molecular chain blocked by methyldimethoxysilyl groups and having the viscosity of 20,000 mPa·s, followed by mixing these components at room temperature and under ordinary pressure for 30 min, and then mixing the same again at room temperature and under a reduced pressure for another 15 min to obtain a mixed product. The methyltrimethoxysilane (D-1) of 6 parts; and 2 parts of the titanium diisopropoxybis (triethoxysilylpropyl acetoacetate) (A-2) prepared in the synthetic example 2, were added to the mixed product, followed by mixing them at room temperature and under ordinary pressure for 5 min, and then mixing them at room temperature and under a reduced pressure for another 60 min so as to obtain a composition 2.

Comparative Example 1

The surface-treated hydrophobic silica (E-1) of 13 parts was added to 100 parts of the dimethylpolysiloxane (B-1) with both ends of its molecular chain blocked by methyldimethoxysilyl groups and having the viscosity of 20,000 mPa·s, followed by mixing these components at room temperature and under ordinary pressure for 30 min, and then mixing the same again at room temperature and under a reduced pressure for another 15 min to obtain a mixed product. The methyltrimethoxysilane (D-1) of 6 parts; and 2 parts of the titanium diisopropoxybis (ethylacetoacetate) (A-3) (product name: TC-750 by Matsumoto Fine Chemical Co., Ltd.), were added to the mixed product, followed by mixing them at room temperature and under ordinary pressure for 5 min, and then mixing them at room temperature and under a reduced pressure for another 60 min so as to obtain a composition C1.

Comparative Example 2

The surface-treated hydrophobic silica (E-1) of 13 parts was added to 100 parts of the dimethylpolysiloxane (B-1) with both ends of its molecular chain blocked by methyldimethoxysilyl groups and having the viscosity of 20,000 mPa·s, followed by mixing these components at room temperature and under ordinary pressure for 30 min, and then mixing the same again at room temperature and under a reduced pressure for another 15 min to obtain a mixed product. The methyltrimethoxysilane (D-1) of 6 parts; and 2 parts of the tetraoctyl titanate (A-4) (product name: TA-30 by Matsumoto Fine Chemical Co., Ltd.), were added to the mixed product, followed by mixing them at room temperature and under ordinary pressure for 5 min, and then mixing them at room temperature and under a reduced pressure for another 60 min so as to obtain a composition C2.

Working Example 3

The surface-treated hydrophobic silica (E-1) of 13 parts by mass was added to 100 parts by mass of the dimethylpolysiloxane (B-2) with both ends of its molecular chain blocked by hydroxyl groups (silanol groups) and having the viscosity of 20,000 mPa·s, followed by mixing these components at room temperature and under ordinary pressure for 30 min, and then mixing the same again at room temperature and under a reduced pressure for another 15 min to obtain a mixed product. The guanidylpropyltrimethoxysilane (C-1) of 0.6 parts by mass; and the α-(dimethoxymethylsilyl) propionic acid 2-ethylhexyl (D-2) of 9.1 parts by mass, were added to the mixed product, followed by mixing them at room temperature and under a reduced pressure for 15 min. After finishing mixing under the reduced pressure, 1 part by mass of the titanium diisopropoxybis (trimethoxysilylpropyl acetoacetate) (A-1) prepared in the synthetic example 1 was added thereto, followed by performing mixing at room temperature and under a reduced pressure for 60 min so as to obtain a composition 3.

Working Example 4

The surface-treated hydrophobic silica (E-1) of 13 parts by mass was added to 100 parts by mass of the dimethylpolysiloxane (B-2) with both ends of its molecular chain blocked by hydroxyl groups and having the viscosity of 20,000 mPa·s, followed by mixing these components under ordinary pressure for 30 min, and then mixing the same again under a reduced pressure for another 15 min to obtain a mixed product. The guanidylpropyltrimethoxysilane (C-1) of 0.6 parts by mass; and the α-(dimethoxymethylsilyl) propionic acid 2-ethylhexyl (D-2) of 9.1 parts by mass, were added to the mixed product, followed by mixing them under a reduced pressure for 15 min. After finishing mixing under the reduced pressure, 2 parts by mass of the titanium diisopropoxybis (trimethoxysilylpropyl acetoacetate) (A-1) prepared in the synthetic example 1 was added thereto, followed by performing mixing under a reduced pressure for 60 min so as to obtain a composition 4.

Working Example 5

The surface-treated hydrophobic silica (E-1) of 13 parts by mass was added to 100 parts by mass of the dimethylpolysiloxane (B-2) with both ends of its molecular chain blocked by hydroxyl groups and having the viscosity of 20,000 mPa·s, followed by mixing these components under ordinary pressure for 30 min, and then mixing the same again under a reduced pressure for another 15 min to obtain a mixed product. The guanidylpropyltrimethoxysilane (C-1) of 0.6 parts by mass; and the α-(dimethoxymethylsilyl) propionic acid 2-ethylhexyl (D-2) of 9.1 parts by mass, were added to the mixed product, followed by mixing them under a reduced pressure for 15 min. After finishing mixing under the reduced pressure, 2 parts by mass of the titanium diisopropoxybis (triethoxysilylpropyl acetoacetate) (A-2) prepared in the synthetic example 2 was added thereto, followed by performing mixing under a reduced pressure for 60 min so as to obtain a composition 5.

Comparative Example 3

The surface-treated hydrophobic silica (E-1) of 13 parts by mass was added to 100 parts by mass of the dimethylpolysiloxane (B-2) with both ends of its molecular chain blocked by hydroxyl groups and having the viscosity of 20,000 mPa·s, followed by mixing these components under ordinary pressure for 30 min, and then mixing the same again under a reduced pressure for another 15 min to obtain a mixed product. The guanidylpropyltrimethoxysilane (C-1) of 0.6 parts by mass; and the α-(dimethoxymethylsilyl)

propionic acid 2-ethylhexyl (D-2) of 9.1 parts by mass, were added to the mixed product, followed by mixing them under a reduced pressure for 15 min. After finishing mixing under the reduced pressure, 1 part of the titanium diisopropoxybis (ethylacetoacetate) (A-3) was added thereto, followed by performing mixing under a reduced pressure for 60 min so as to obtain a composition C3.

Comparative Example 4

The surface-treated hydrophobic silica (E-1) of 13 parts by mass was added to 100 parts by mass of the dimethylpolysiloxane (B-2) with both ends of its molecular chain blocked by hydroxyl groups and having the viscosity of 20,000 mPa·s, followed by mixing these components under ordinary pressure for 30 min, and then mixing the same again under a reduced pressure for another 15 min to obtain a mixed product. The guanidylpropyltrimethoxysilane (C-1) of 0.6 parts by mass; and the α-(dimethoxymethylsilyl) propionic acid 2-ethylhexyl (D-2) of 9.1 parts by mass, were added to the mixed product, followed by mixing them under a reduced pressure for 15 min. After finishing mixing under the reduced pressure, 2 parts of the titanium diisopropoxybis (ethylacetoacetate) (A-3) was added thereto, followed by performing mixing under a reduced pressure for 60 min so as to obtain a composition C4.

(Test)

[Tack-Free Time]

The tack-free time of each of the room temperature-curable resin compositions prepared in working examples 3 to 5; and comparative examples 3 and 4, were measured. The results thereof are shown in Table 2.

[Sheet Physical Property]

Each room temperature-curable resin composition immediately after being prepared in working examples 1 to 5 and comparative examples 1 to 4 was pushed out as a sheet-shaped object having a thickness of 2 mm. Such sheet was then exposed to an air of 23° C. and 50% RH, and was left under the same atmosphere for 7 days to obtain a cured product. The physical properties (hardness, shear elongation at break and tensile strength) of the cured product thus obtained were then measured in accordance with JIS K-6249. Particularly, the hardness of the cured product was measured by a durometer A-type hardness meter as set forth in JIS K-6249 (initial physical property). The results thereof are shown in Table 1 and Table 2.

Further, each room temperature-curable resin composition immediately after being prepared in working examples 3 to 5; and comparative examples 3 and 4, was put into a sealed container. The composition in the sealed container was then left at 70° C. for 7 days, and a sheet of the thickness of 2 mm was later formed from such composition that had been left at 70° C. for 7 days. A similar measurement was also performed on such sheet (storage test). The results thereof are shown in Table 2.

[Shear Adhesion Test]

Each room temperature-curable resin composition immediately after being prepared in working examples 1 to 5 and comparative examples 1 to 4; and an adherend (aluminum, copper, SUS, PC, ABS, PBT, glass) having a width of 25 mm and a length of 100 mm were used to prepare a shear adhesion test specimen having an adhesive area of 2.5 mm$^2$ and an adhesive thickness of 1 mm by performing curing at 23° C. and 50% RH for 7 days. A shear adhesion force was then measured in accordance with JIS K-6249. The results thereof are shown in Table 1 and Table 2.

TABLE 1

| | Amount (part by mass) | Working example 1 | Working example 2 | Comparative example 1 | Comparative example 2 |
|---|---|---|---|---|---|
| | Composition | 1 | 2 | C1 | C2 |
| Component (A) | A-1 | 2 | — | — | — |
| | A-2 | — | 2 | — | — |
| | A-3 | — | — | 2 | — |
| | A-4 | — | — | — | 2 |
| Component (B) | B-1 | 100 | 100 | 100 | 100 |
| Component (D) | D-1 | 6 | 6 | 6 | 6 |
| Component (E) | E-1 | 13 | 13 | 13 | 13 |
| Evaluation result | | | | | |
| Sheet physical property | Hardness Duro.A | 30 | 29 | 24 | 32 |
| | Shear elongation at break (%) | 502 | 487 | 513 | 465 |
| | Tensile strength (MPa) | 2.89 | 2.73 | 1.72 | 2.72 |
| Shear adhesion test | Aluminum/Aluminum (MPa) | 1.33 | 1.33 | 0.34 | 0.32 |
| | Cohesion failure rate (%) | 100 | 100 | 0 | 0 |
| | Copper/Copper (MPa) | 1.23 | 1.12 | 0.28 | 0.15 |
| | Cohesion failure rate (%) | 90 | 95 | 0 | 0 |
| | SUS/SUS (MPa) | 0.92 | 0.99 | 0.25 | 0.18 |
| | Cohesion failure rate (%) | 85 | 95 | 0 | 0 |
| | PC/PC (MPa) | 0.74 | 0.82 | 0.52 | 0.35 |
| | Cohesion failure rate (%) | 60 | 90 | 90 | 0 |
| | ABS/ABS (MPa) | 1.06 | 0.99 | 0.29 | 0.15 |
| | Cohesion failure rate (%) | 85 | 90 | 0 | 0 |
| | PBT/PBT (MPa) | 0.84 | 0.90 | 0.17 | 0.10 |
| | Cohesion failure rate (%) | 95 | 95 | 0 | 0 |
| | Glass/Glass (MPa) | 1.77 | 1.70 | 0.92 | 0.51 |
| | Cohesion failure rate (%) | 100 | 100 | 100 | 0 |

TABLE 2

|  | Composition | Amount (part by mass) | | | | |
|---|---|---|---|---|---|---|
|  |  | Working example | | | Comparative example | |
|  |  | 3 / 3 | 4 / 4 | 5 / 5 | 3 / C3 | 4 / C4 |
| Component (A) | A-1 | 1 | 2 | — | — | — |
|  | A-2 | — | — | 2 | — | — |
|  | A-3 | — | — | — | 1 | 2 |
| Component (B) | B-1 | 100 | 100 | 100 | 100 | 100 |
| Component (C) | C-1 | 0.6 | 0.6 | 0.6 | 0.6 | 0.6 |
| Component (E) | E-1 | 13 | 13 | 13 | 13 | 13 |
| Component (D) | α-(dimethoxymethyl) propionic acid 2-ethylhexyl (D-2) | 9.1 | 9.1 | 9.1 | 9.1 | 9.1 |
| Evaluation result | | | | | | |
| Tack-free time (min.) | | 8 | 7 | 9 | 9 | 9 |
| Sheet physical property (initial physical property) | Hardness Duro.A | 25 | 29 | 30 | 29 | 32 |
|  | Shear elongation at break (%) | 331 | 379 | 321 | 379 | 386 |
|  | Tensile strength (MPa) | 1.40 | 1.74 | 1.67 | 1.85 | 2.09 |
| Sheet physical property (Storage test) | Hardness Duro.A | 29 | 31 | 30 | 31 | 33 |
|  | Shear elongation at break (%) | 336 | 386 | 371 | 357 | 509 |
|  | Tensile strength (MPa) | 1.49 | 1.86 | 1.75 | 1.75 | 2.78 |
| Shear adhesion test | Aluminum/Aluminum (MPa) | 1.66 | 1.65 | 1.78 | 1.72 | 0.62 |
|  | Cohesion failure rate (%) | 100 | 100 | 100 | 100 | 60 |
|  | Copper/Copper (MPa) | 1.10 | 1.29 | 1.22 | 0.22 | 0.23 |
|  | Cohesion failure rate (%) | 100 | 90 | 100 | 0 | 0 |
|  | SUS/SUS (MPa) | 1.09 | 1.10 | 1.26 | 0.44 | 0.29 |
|  | Cohesion failure rate (%) | 100 | 60 | 70 | 0 | 0 |

According to the results shown in Table 1, it is obvious that the organic titanium compound of the invention that was used in working examples 1 and 2 had contributed to the expression of a favorable adhesiveness while maintaining the catalytic activity thereof, as compared to the existing organic titanium catalysts that were used in comparative examples 1 and 2.

Further, as shown in Table 2, the resin compositions of working examples 3 to 5 that contained the organic titanium compound of the invention as a curing catalyst had exhibited equivalent levels of curabilities and rubber physical properties; and high adhesion strengths and cohesion failure rates, as compared to the resin compositions of comparative examples 3 and 4 that used the existing organic titanium catalysts. Furthermore, the rubber physical properties of the resin compositions of working examples 3 to 5 were also not significantly impaired even after the storage test.

As shown above, it is obvious that since the room temperature-curable resin composition of the invention contains the particular organic titanium compound as a curing catalyst, it can be cured in a short period of time; become a room temperature-curable resin composition having a sufficient adhesion strength; and exhibit, after curing, a sufficient hardness, shear elongation at break and tensile strength i.e. rubber physical properties.

However, the present invention is not limited to the above embodiment. The above embodiment is merely an example; and any embodiment shall be included in the technical scope of the present invention, provided that the embodiment has a structure substantially identical to the technical ideas described in the scope of the patent claims of the invention, and that the embodiment also brings about similar functions and effects as such technical ideas.

The invention claimed is:

1. A moisture-curable and room temperature-curable organopolysiloxane resin composition comprising:

(A) a curing catalyst comprising an organic titanium compound represented by an average composition formula (I):

wherein $R^1$ represents a substituted or unsubstituted monovalent hydrocarbon group having 1 to 12 carbon atoms; R represents a substituted or unsubstituted monovalent hydrocarbon group having 1 to 12 carbon atoms; A represents a divalent hydrocarbon group having 3 to 6 carbon atoms; Y represents a hydrolyzable group; and a represents a number satisfying 0<a<4; and (B) a curable organopolysiloxane comprising a linear diorganopolysiloxane represented by a general formula (5) wherein both ends of its molecular chain are blocked by hydroxyl groups; or a linear diorganopolysiloxane represented by a general formula (6) wherein both ends of its molecular chain are blocked by hydrolyzable groups wherein R represents a substituted or unsubstituted monovalent hydrocarbon group having 1 to 12 carbon atoms; X represents an oxygen atom or a divalent or trivalent hydrocarbon group having 1 to 8 carbon atoms; Y' represents a hydrolyzable group; b represents 0 or 1; and m represents a number by which a viscosity of such diorganopolysiloxane will become 100 to 1,000,000 mPa·s at 25° C.

2. The moisture-curable and room temperature-curable organopolysiloxane resin composition according to claim 1, wherein the curing catalyst (A) is in an amount of 0.01 to 30 parts by mass per 100 parts by mass of the curable organopolysiloxane (B).

3. The moisture-curable and room temperature-curable organopolysiloxane resin composition according to claim 2, further comprising, per 100 parts by mass of the component (B),
    (C) 0 to 15 parts by mass of a curing catalyst other than the component (A),
    (D) 0 to 30 parts by mass of a hydrolyzable group-containing silane and/or a partial hydrolysis condensate thereof,
    (E) 0 to 1,000 parts by mass of a filler and
    (F) 0 to 30 parts by mass of an adhesion promoter.

4. A coating agent, adhesive agent or sealing agent comprising the moisture-curable and room temperature-curable organopolysiloxane resin composition as set forth in claim 1.

5. A method for producing a cured product of the moisture-curable and room temperature-curable organopolysiloxane resin composition according to claim 1 comprising
    curing the composition with an organic titanium compound represented by the average composition formula (I):

wherein $R^1$ represents a substituted or unsubstituted monovalent hydrocarbon group having 1 to 12 carbon atoms; R represents a substituted or unsubstituted monovalent hydrocarbon group having 1 to 12 carbon atoms; A represents a divalent hydrocarbon group having 3 to 6 carbon atoms; Y represents a hydrolyzable group; and a represents a number satisfying $0<a<4$.

6. The moisture-curable and room temperature-curable organopolysiloxane resin composition according to claim 1, wherein component (B) is a linear diorganopolysiloxane represented by the general formula (5) wherein both ends of its molecular chain are blocked by hydroxyl groups.

* * * * *